United States Patent
Howell et al.

(10) Patent No.: US 8,152,216 B2
(45) Date of Patent: Apr. 10, 2012

(54) AUTOMATED COVER SYSTEM FOR VEHICLE-MOUNTED CONTAINERS

(75) Inventors: Troy D. Howell, Mantorville, MN (US); Daniel F. Kubista, Pine Island, MN (US); Robert A. Wood, Jr., Honolulu, HI (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 336 days.

(21) Appl. No.: 12/231,193

(22) Filed: Aug. 29, 2008

(65) Prior Publication Data

US 2010/0052357 A1    Mar. 4, 2010

(51) Int. Cl.
*B60J 11/00* (2006.01)
*B62D 61/10* (2006.01)

(52) U.S. Cl. ............ 296/98; 296/100.01; 296/100.18; 180/24.01

(58) Field of Classification Search ............ 296/98, 296/100.01, 100.11, 100.15, 100.18; 180/24.01
See application file for complete search history.

(56) References Cited

U.S. PATENT DOCUMENTS

| | | | |
|---|---|---|---|
| 3,738,075 A | 6/1973 | Nansel | |
| 4,874,196 A | 10/1989 | Goldstein et al. | |
| 5,238,287 A | 8/1993 | Haddad, Jr. | |
| 5,275,459 A | 1/1994 | Haddad, Jr. | |
| 5,284,224 A | 2/1994 | Carruth et al. | |
| 5,292,169 A | 3/1994 | O'Brian | |
| 5,340,187 A | 8/1994 | Haddad, Jr. | |
| 5,517,925 A | 5/1996 | Early | |
| 5,743,700 A | 4/1998 | Wood, Jr. et al. | |
| 5,803,528 A | 9/1998 | Haddad, Jr. | |
| 5,806,911 A | 9/1998 | Haddad, Jr. | |
| 5,829,818 A | 11/1998 | O'Daniel | |
| 6,089,645 A | 7/2000 | Haddad, Jr. | |
| 6,109,680 A | 8/2000 | Horner et al. | |
| 6,206,448 B1 | 3/2001 | Haddad, Jr. | |
| 6,237,985 B1 | 5/2001 | O'Brian | |
| 6,250,709 B1 | 6/2001 | Haddad, Jr. | |
| D445,396 S | 7/2001 | Wood | |
| 6,347,826 B1 | 2/2002 | Horner et al. | |
| 6,464,283 B2 | 10/2002 | Haddad, Jr. | |
| 6,478,361 B1 | 11/2002 | Wood | |
| 6,575,518 B1 | 6/2003 | Henning | |
| 6,695,383 B2 | 2/2004 | Wood | |
| 6,814,386 B2 | 11/2004 | Wood | |
| 6,893,071 B2 | 5/2005 | Chabot | |
| 6,896,312 B2 | 5/2005 | Talbot | |
| 6,983,975 B2 | 1/2006 | Morrow | |
| 7,111,891 B2 | 9/2006 | O'Brian et al. | |
| 7,147,264 B2 | 12/2006 | Morrow | |
| 7,370,904 B2 | 5/2008 | Wood, Jr. et al. | |
| 2001/0010430 A1 | 8/2001 | Mentink | |
| 2002/0014780 A1 | 2/2002 | Searfoss | |
| 2003/0158640 A1 | 8/2003 | Pillar et al. | |
| 2006/0043754 A1 | 3/2006 | Smith | |

OTHER PUBLICATIONS

International Search Report and Written Opinion of the International Searching Authority.

*Primary Examiner* — Glenn Dayoan
*Assistant Examiner* — Melissa A Black
(74) *Attorney, Agent, or Firm* — Nikolai & Mersereau, P.A.; C. G. Mersereau

(57) ABSTRACT

A self-contained, vehicle-mounted system for operating a retractable cover with respect to proximate open top containers transported by the vehicle to cover and uncover the containers. The system includes all of the items necessary to accomplish the covering and uncovering of a container and needs only to be mounted on the vehicle and connected to a source of electric power on the vehicle.

13 Claims, 16 Drawing Sheets

AUTOMATED COVER SYSTEM FOR VEHICLE-MOUNTED CONTAINERS

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to mechanized systems for covering open top containers with flexible covers for transport and, more particularly, relates to a self-contained vehicle/mounted system for covering vehicle mounted containers that are carried on a variety of vehicles including those permanently mounted on truck vehicles, such as dump trucks, those associated with roll-on/roll-off hoists, and the like. The system is an entirely self-contained unit. The only required connection is to the vehicle electrical system; consequently, the system of the invention can be added or retrofitted without design modifications or changes in any existing vehicle accessory or hydraulic system.

II. Related Art

Open top containers that are carried by trucks, trailers or other similar vehicles and which are used to transport various classes of loose materials are widely used in construction projects, refuse disposal and other endeavors. These include, but are not limited to gravel and dump trucks and roll-on/roll-off container handling trucks, etc. These vehicles are generally required to have the open tops of containers closed or covered when filled dump bodies or other containers are transported on public roads and highways. These dump bodies, containers or boxes (collectively referred to herein as "containers") are usually rectangular and do resemble large open top boxes from which loaded materials may easily be lost during transport if the load remains uncovered. In addition, the open top enables the entry of rain or snow which can hamper the operation as well.

The tops of these containers are typically closed using a heavy flexible cover material such as a canvas or cloth tarpaulin or "tarp". The containers are generally quite large with capacities of 10, 20 or even 50 cubic yards. This makes it difficult for a driver to cover or uncover the container by hand, both from the standpoint of manipulating a large cover and the increased risk of injury from climbing up on the truck to manipulate the cover. These difficulties have led to the development of a variety of mechanized systems for covering and uncovering truck-mounted open top containers. These include truck-mounted assemblies that are pneumatically or hydraulically operated to apply and retract flexible covers over the top of open containers carried on vehicles, particularly roll-off containers. These mechanized systems have become known in the art as "tarper" systems.

Examples of such systems include those shown in U.S. Pat. No. 5,829,818 to O'Daniel and in U.S. Pat. No. 7,370,904 to Wood, Jr. et al. The '904 patent is assigned to the same assignee as the present invention.

Prior systems have been required to connect into the existing hydraulic or pneumatic system of a vehicle on which they are installed. This puts an extra burden on the hydraulic or pneumatic system and may require the vehicle to be retrofitted, or otherwise provided, with an additional spool valve, larger oil reservoir, hydraulic pump, etc., or a larger air compressor unit or pressure tank, which may add a great deal of difficulty and cost to the installation.

Thus, while such prior systems have met with a degree of success, there remains a need for a self-contained system with improved mechanical and interlocked control features that provides smooth operation, can be used on a variety of container sizes, and which can be easily added or retrofit to a vehicle needing only an electrical connection to an existing vehicle's electrical system.

SUMMARY OF THE INVENTION

By means of the present invention, there is provided a self-contained, vehicle-mounted, mechanized retractable cover system for covering and uncovering a proximate open top container or truck body. The system includes a flexible cover and a deployment mechanism containing all of the components necessary for operating a mechanism to accomplish the covering and uncovering of a container and needs only to be mounted on a vehicle and connected to a source of electric power on the vehicle.

The system includes a flexible cover configured to cover the top of an open transport container as it is positioned on a vehicle. The cover is attached at one end to a moveable advancing/retracting storage source and has a free end. The storage source may be a reel or other winding mechanism and which includes a mechanism in the storage source for rolling up the cover during retraction and enabling unrolling or paying out of the cover during deployment. The free end of the cover is connected to a fixed support structure (discussed below). The support structure is mounted on the vehicle such that it is positioned at one end of the container to be covered as the container is positioned on the vehicle.

The support structure includes a base section and a vertically adjustable mast or gantry section. The bottom of the base section is fixed to the vehicle chassis, deck or other substantial vehicle support. The mast is relatively vertically movable and an integral lift mechanism is provided so that the mast can be raised and lowered with respect to the base section as needed. In one preferred embodiment, a pair of opposed, or oppositely mounted "piggy-backed" hydraulic cylinders having rods extending in opposite directions are employed such that one or both can be extended to adjust the height of the mast as needed which enables compensation for containers of different depths, for example. The free end of the cover is attached to the mast section.

A deployment mechanism for extending and retracting the flexible cover is provided that includes a frame to which a pair of spaced, pivotally mounted articulated arms having fixed ends are connected to an arm pivoting mechanism, one arm being connected and operated at a location corresponding to each side of a container to be covered intermediate the ends thereof. Each arm is provided with a drive mechanism connected to pivot the arm between ends of a container to extend and retract the cover. The pivotally mounted arms, in one embodiment, are operated by synchronized hydraulic rotary actuators. The arms have free ends which address alternate ends of a container as the arms are pivoted. Thus, the lower ends of each arm are connected to the actuators and the upper or free ends are connected to the ends of the storage source containing the cover so that as the arms pivot, they operate to move the retracting storage source to thereby extend and retract the cover between the retracted or home position to the full length of the container.

Each arm has telescoping members which enable the length of the arm to be adjusted as necessary to compensate a vertical adjustment of the mast. This enables a plurality of container sizes to be covered by the system. A locking/releasing device is provided in each arm which is coordinated and interlocked with the operation of the mast so that the length of the arm remains fixed or locked when the mast is stationary and becomes adjustable when the height of the mast is adjusted with the cover in the retracted or home position. In one embodiment, the locking/releasing device is a hydraulic cylinder-operated sliding wedge system.

An important aspect of the invention is that the system is self-contained and further includes a hydraulic fluid reservoir and a hydraulic pump for supplying pressurized hydraulic fluid to operate the entire system and necessary electrical controls and interlocks required to complete a self-contained system. The system need only be connected to the existing electrical system of a vehicle to be operated.

BRIEF DESCRIPTION OF THE DRAWINGS

In the drawings wherein like reference characters are utilized to depict like parts throughout the same.

DETAILED DESCRIPTION

The detailed description is directed to an embodiment of a self-contained, vehicle-mountable system for a operating retractable cover with respect to an open top container mounted on a vehicle to cover and uncover the container. The detailed description is intended to describe an example of an embodiment of the inventive concepts and is not meant to limit the scope of the development or invention in any manner.

Figure 6:
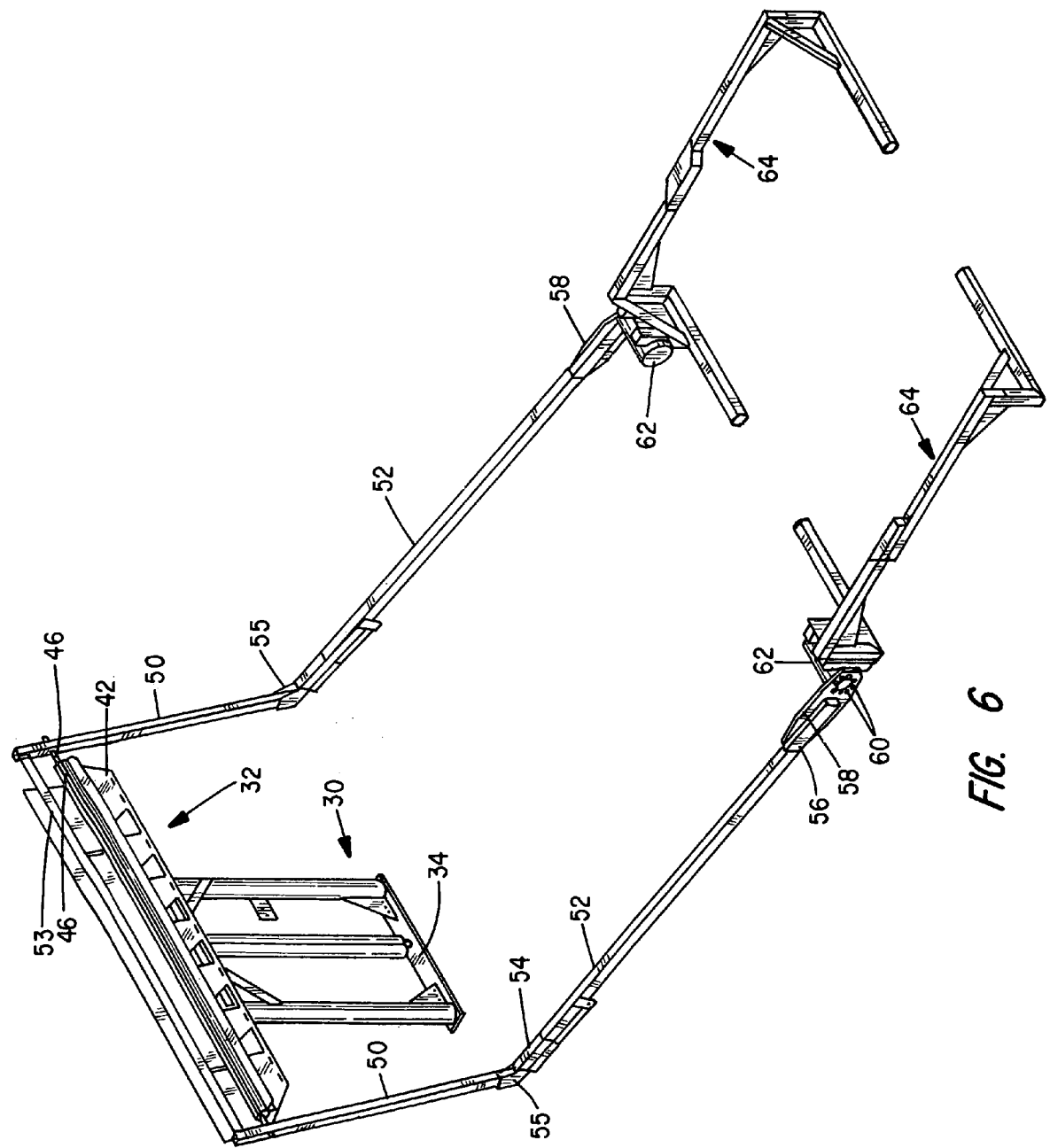
FIG. 6 is a perspective view of a self-contained, vehicle-mounted system in accordance with the invention unmounted.
Figure 7:
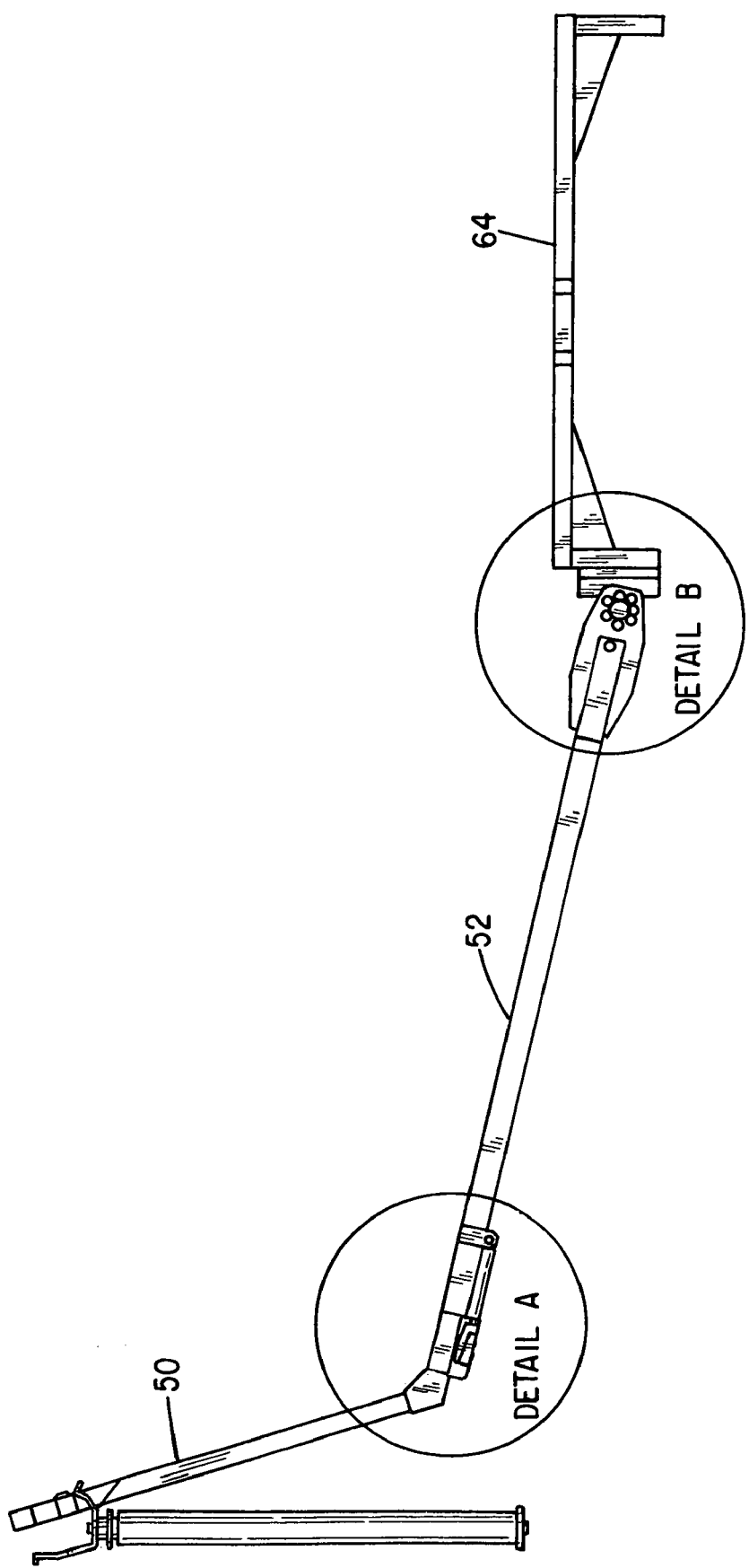
FIG. 7 is a reduced partial side view of the assembly of FIG. 6 showing details A and B.

FIGS. 1-5 depict an embodiment of the invention as mounted on the stringers or longitudinal channels of a vehicle chassis with a variety of open top boxes or containers shown mounted for transport on the vehicle. FIG. 6 depicts an unmounted tarper assembly without electrical or hydraulic connections.

A vehicle-mountable, self-contained retractable cover operating system in accordance with the present development is shown generally at 20 in the figures. It is shown addressing a 20-yard container or box 22 in FIGS. 2 and 4 and a deeper 50-yard box 24 in FIGS. 3 and 5. The containers or boxes are generally rectangular structures of the same length and width dimensions with containers of different capacities varying in height or depth so that boxes of several capacities can be carried by a given transport. The system in FIGS. 1-5 as shown mounted to longitudinal main chassis channels, as indicated, which are typical of a truck of a roll-off/roll-on box container-carrying class.

Figure 1:
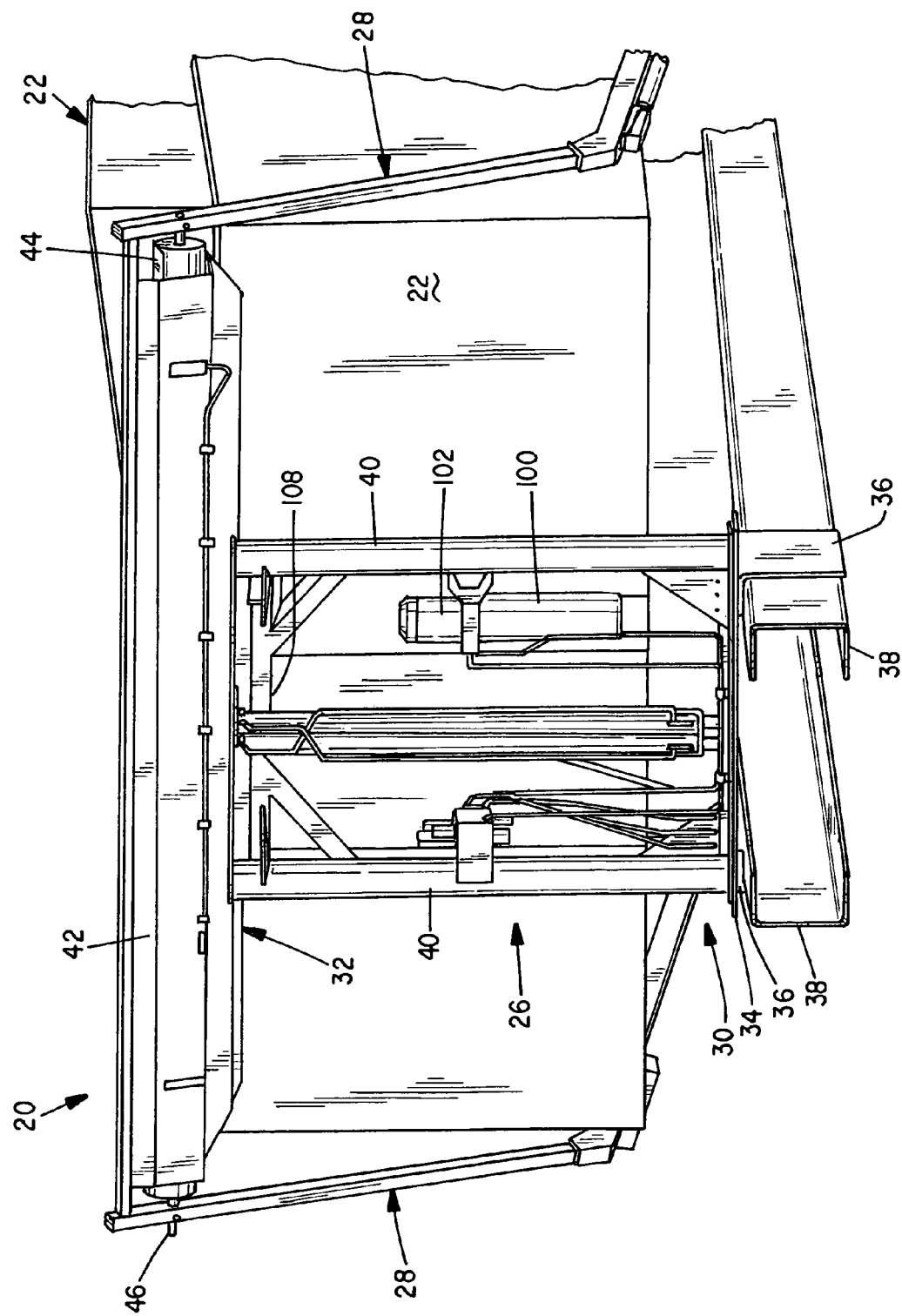
FIG. 1 is an enlarged fragmentary front perspective view of a vehicle-mounted system of the invention as seen from the front of a container to be covered with the mast in the fully lowered position and arms forward and the tarp in the fully retracted or stowed position.

The system includes a support structure shown generally at 26 in FIG. 1 and a pair of spaced opposed articulated operating arms generally at 28. The support structure 26 includes a stationary base section assembly 30 and a mast or gantry section assembly 32. The base section 30 includes a heavy base plate member 34 supported by spaced support shapes 36 which are designed to attach to the main vehicle chassis channels or stringers illustrated at 38. It will be appreciated that the base support may be adapted to attach to other vehicles, deck or chassis designs as indicated or even be mounted elsewhere.

The support structure shown in FIG. 1 further includes telescoping main mast or gantry support members 40 which support a trough-shaped structure 42 for storing the cover when not in use and which is, in turn, attached to one end of the flexible cover 44 which is supported on a roll-type winding mechanism or cover roll or source having end shafts, one of which is depicted at 46 and which is carried by the upper sections 50 of the spaced operating arms 28. Each of the spaced, opposed operating arms 28 further includes in addition to an upper arm section 50, a telescoping lower arm section that includes a fixed member 52 and a telescoping member 54 as shown in FIG. 6. The upper arm sections are connected to a common stabilizing member 53. Members 50 and 54 are connected at a fixed obtuse angle by an elbow-shape 55. Each member 52 is connected by a short tubular section to a gusset or arm actuator-mounting weldment plate 58. A plurality of fasteners 60 connect the mounting plate to a hydraulic rotary actuator 62. The rotary actuators are identical and operate independently as synchronized or coordinated from a common hydraulic fluid source as by a flow divider, as will be described. Such devices are well known and commercially available. A further stabilizing support frame for each arm and actuator is shown at 64.

Figure 8A:
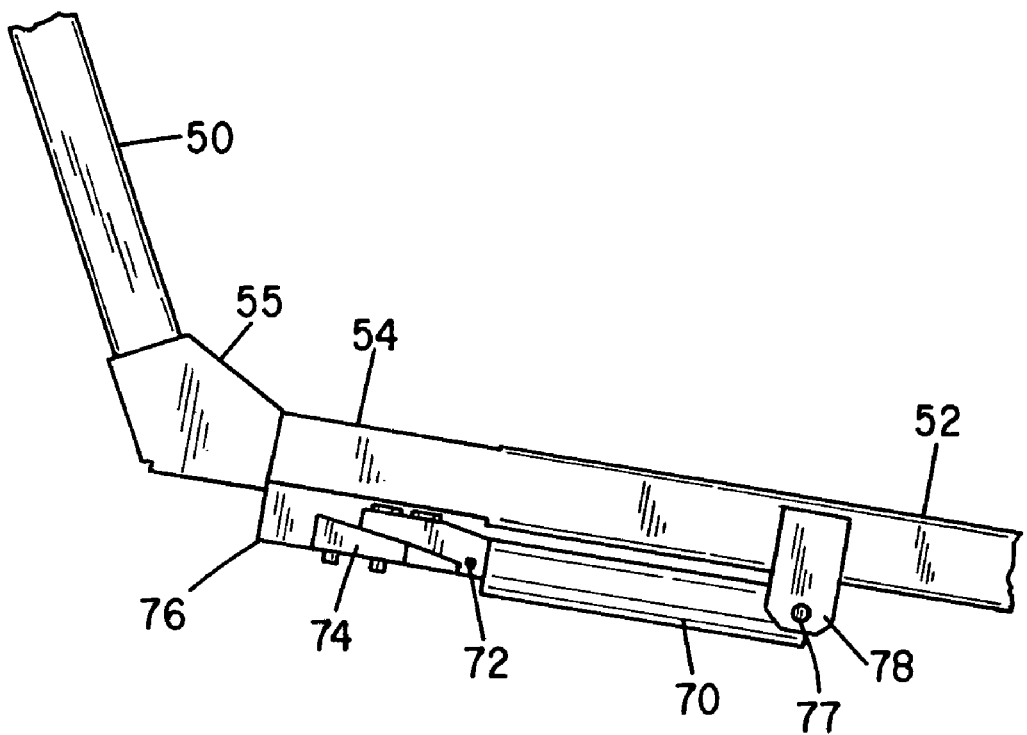
FIGS. 8a and 8b depict detail A from FIG. 7 shown with the arm in the unlocked and locked positions, respectively.
Figure 8B:
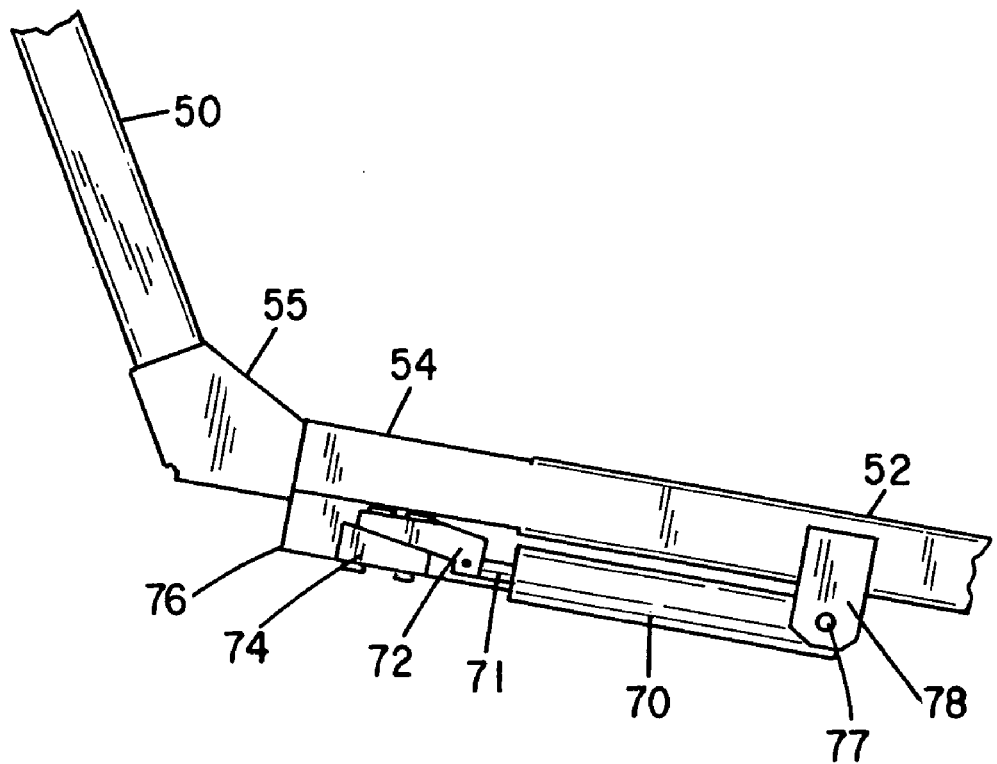
Figure 9:
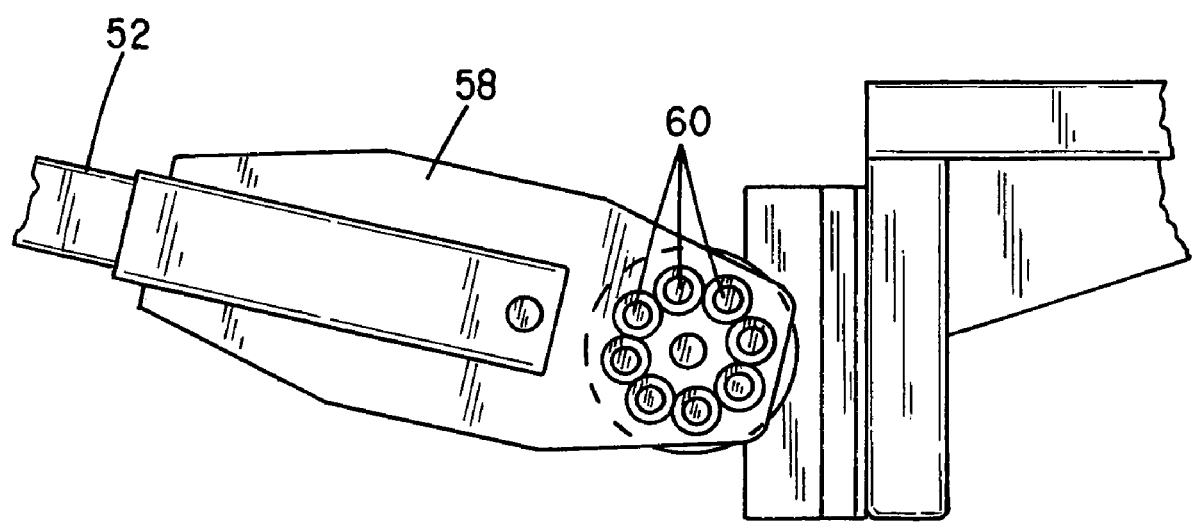
FIG. 9 is an enlarged view of detail B from FIG. 7.

Each of the telescoping arm sections is provided with a hydraulic locking arrangement which allows inner tubular member 54 to move relative to outer member 52 when the lock is released and fixes the length of the lower arm section when the arm lock is engaged. As best seen in FIGS. 8a and 8b, the locking arrangement includes a hydraulic cylinder 70 which is mounted from member 52 and with connected rod 71 operates a locking member 72 along a wedge member 74 which is fixed in a sleeve member 76 which, in turn, also encloses and protects hydraulic cylinder rod 71 and enables arm section 54 to slide relative to section 52. Thus, when disengaged, the locking arrangement enables adjustment of the length of the lower arm member to accommodate a variety of container or box sizes and, when engaged, locks the length during deployment and retraction of the flexible cover.

The locking arrangement is shown in the released or unlocked position in FIG. 8a and in the engaged or locked position in FIG. 8b. The blind end of cylinder 70 is fixed to the member 52 as by a shaft 77 connected between a pair of mounting plates, one of which is shown at 78.

As indicated, an important aspect of the present invention is that the vehicle-mountable system for operating a retractable cover with respect to an open top container of the invention is self-contained and can be readily added to an existing vehicle chassis without requiring re-design or modification of existing auxiliary systems on the vehicle. The automated container cover system of the invention then includes its own complete hydraulic and electrical control systems and requires only connection to the existing vehicle DC electrical system.

When the system of the present invention is added to a vehicle, one does not have to modify an existing hydraulic system to install, for example, flow dividers, extra spool valve sections and other components. When it is necessary to modify an existing hydraulic systems, the components added, 1) generate additional heat, 2) allow the system to become inefficient, 3) slow the speeds of other functions, 4) may lead to premature hydraulic system wear and/or failure and involve considerable time and expense. The installation of the present system, including control and other functions, is simple and straight forward.

Another important feature of this system is that it is ecologically friendly. It enables the truck engine to be operated at normal idle speed rather than at high idle to deploy and retract the cover, which enables considerable fuel savings over the lifetime of the unit. The chassis can simply idle at normal speed while operating the tarper as only electric current need be supplied.

Figure 10:
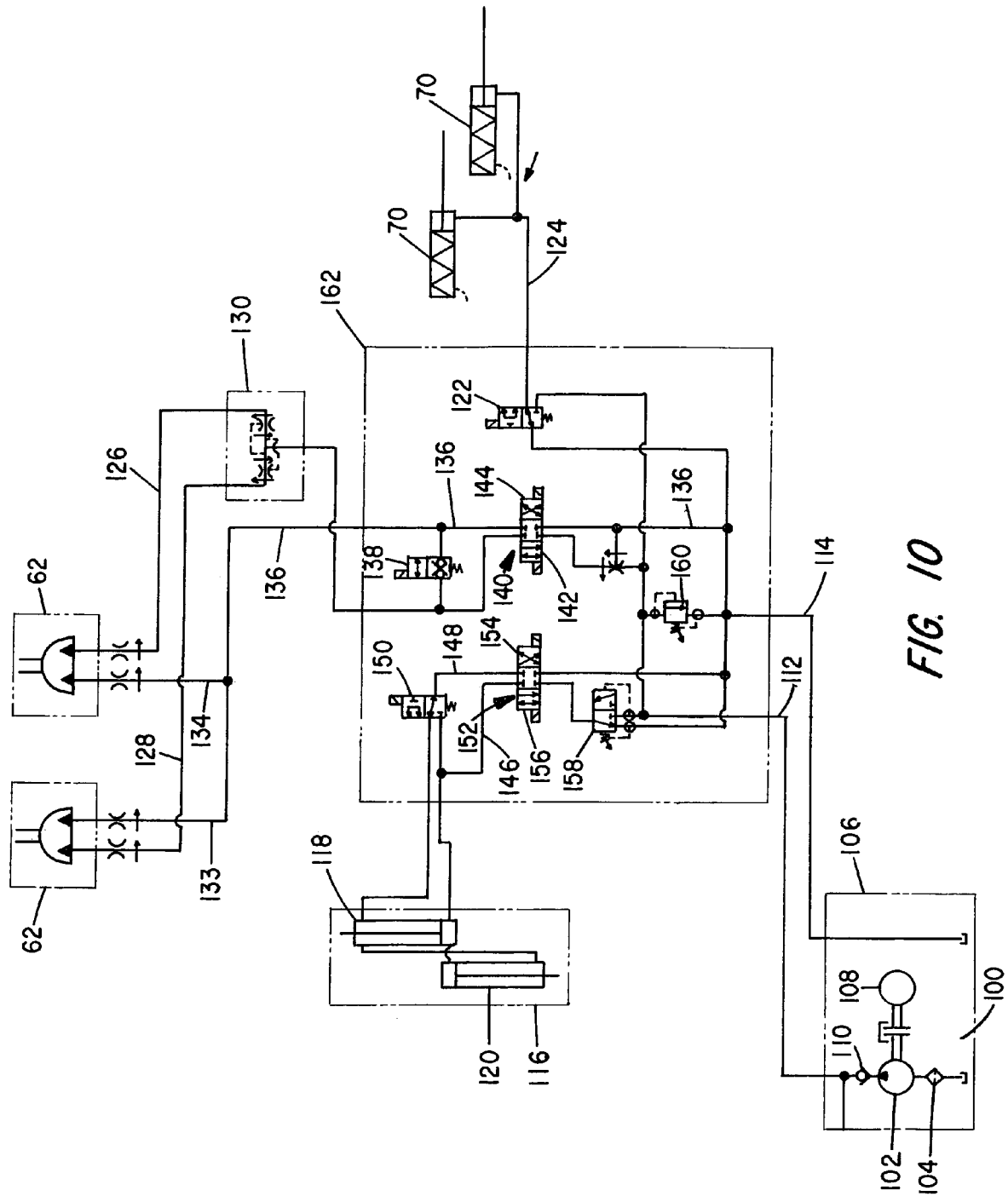
FIG. 10 is a hydraulic plumbing schematic diagram for the embodiment of FIGS. 1-9.

As shown in the FIGS. 1-5 and in the schematic diagram of FIG. 10, the system includes a fluid reservoir 100 connected to the suction side of hydraulic pump 102 through an inlet filter 104. Power for the system is supplied through a hydraulic fluid supply unit indicated by the dash lines at 106. Power connection is to a conventional vehicle 12V DC power system, as will be described in greater detail in connection with the schematic FIGS. 11(a)-11(c). The power supply is used to drive the pump 102 as shown at 108 and operate the controls, solenoid valves, alarms and other electrically operated devices throughout the system as shown in those figures. The outlet of the pump 102 is connected through a check valve 110 to the high pressure side of the hydraulic manifold "P" on line 112 and a drain or "T" connection which represents a return line 114 for the hydraulic system leading to the oil reservoir in sump 100.

The system further includes a mast operating arrangement shown generally by the dash lines at 116 and includes upper and lower oppositely disposed "piggy-backed" hydraulic cylinders including an upper cylinder 118 and lower cylinder 120 which coordinate to raise and lower the gantry or mast. The diagram further includes the arm locking hydraulic cylinders 70 and hydraulic rotary arm actuators 62. The operation of the single acting, spring-biased arm locking cylinders 70 is controlled through a two-position arm lock solenoid valve SV4 shown at 122, which operates in a manner such that both arms are locked at a given length or are released together from common hydraulic line 124, as shown in the diagram of FIG. 10.

The hydraulic rotary actuators 62 are supplied with high pressure fluid simultaneously on lines 126 and 128 from a flow divider manifold indicated by the dash lines at 130 which, in turn, is supplied through high pressure line 132 and return lines are shown at 133 and 134 which flow into common return line 136. The operation of the hydraulic rotary actuator 62 is further controlled by a two-position locking solenoid valve SV5 at 138 and three-position arm control solenoid valve SV2 at 140 which indicates an arms forward position 142 and an arms back position at 144. Likewise, cylinders 118 and 120 are supplied through high pressure line 146 and return or drain line 148, as controlled by two-position mast fast solenoid valve SV3 at 150 and three-position solenoid valve SV1 at 152 further having mast up position 154 and mast down position at 156. A pressure switch is shown at 158 and a return or dump valve is shown at 160. The control valves for operating the cover system are all found in a main manifold which is depicted by the dash lines at 162.

Figure 11A:
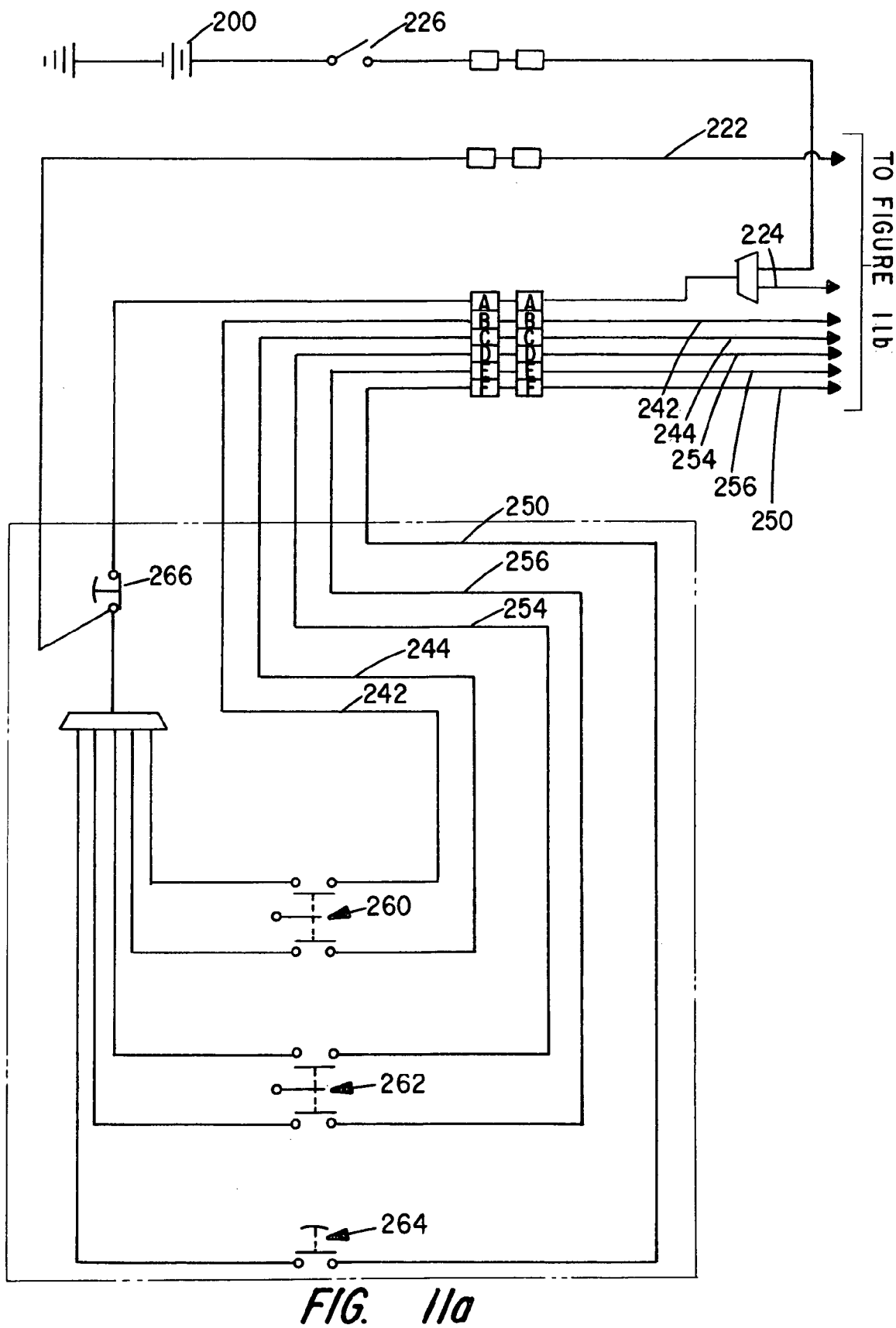
FIGS. 11(a), 11(b) and 11(c) are parts of a composite electrical schematic diagram for the embodiment of FIGS. 1-9.
Figure 11B:
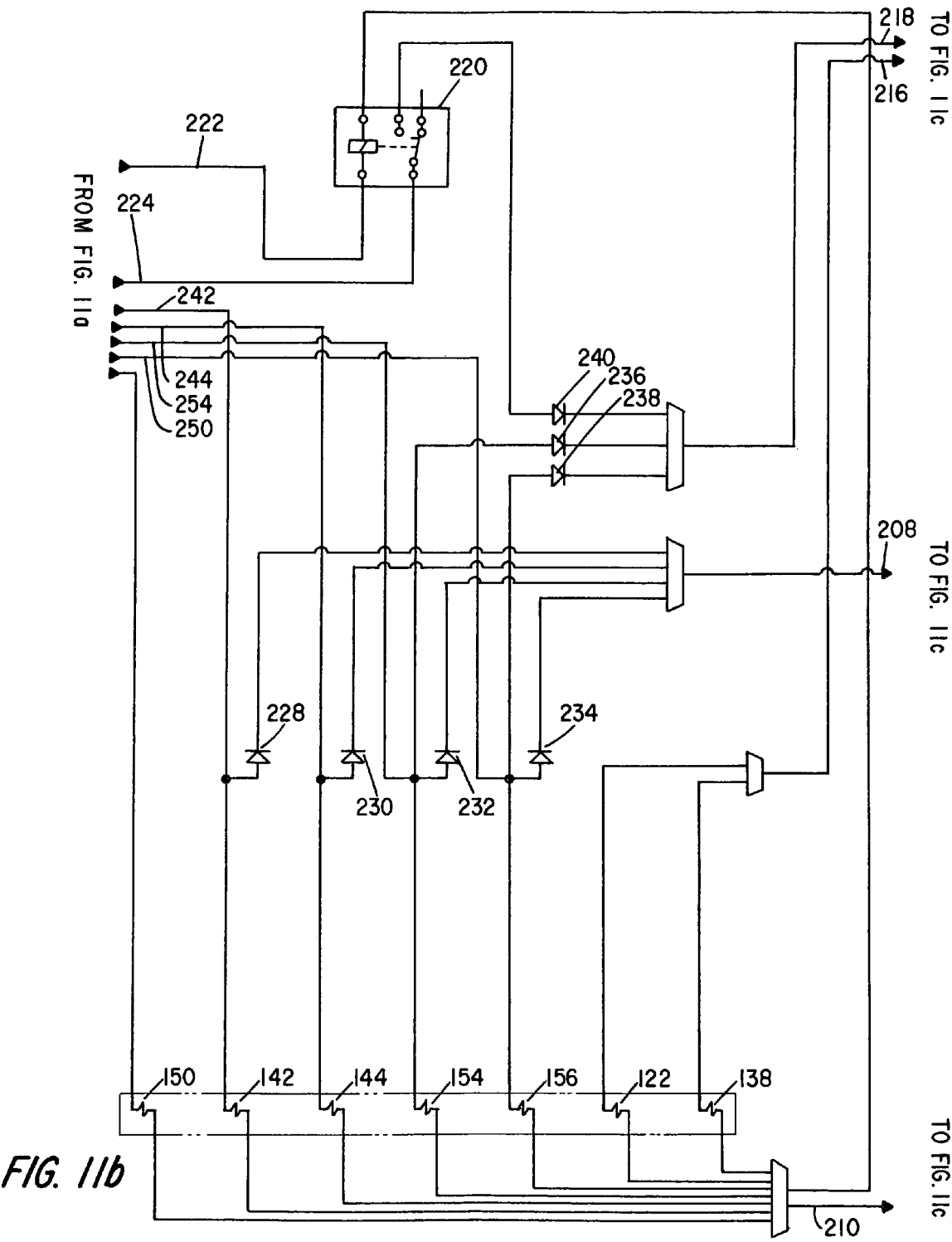
Figure 11C:
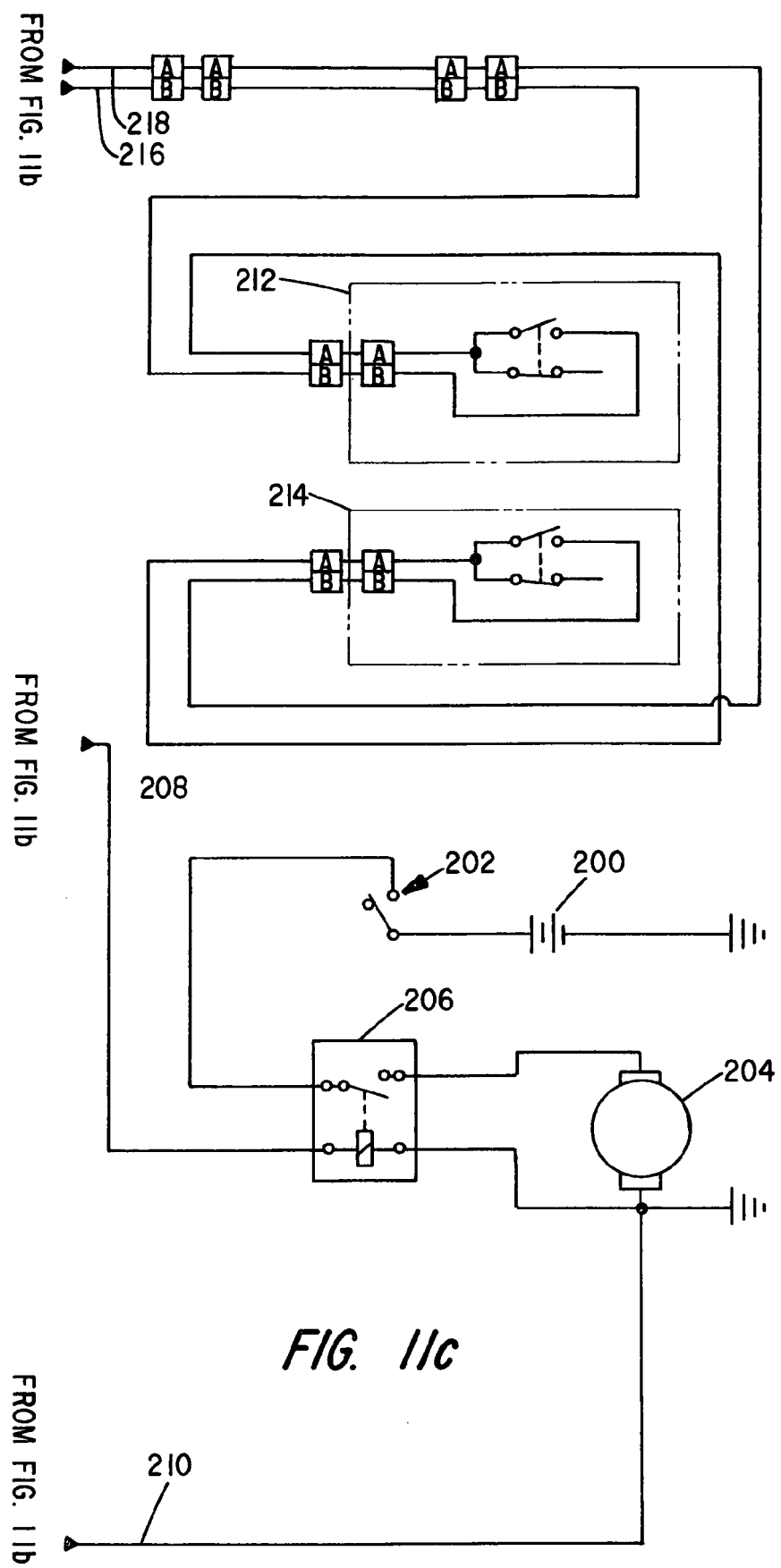

FIGS. 11(a)-11(c) depict an electrical schematic diagram suitable for controlling and operating the embodiment of FIGS. 1-10. FIG. 11(c) shows a D.C. power supply indicated by a battery 200, which may be the main vehicle battery (FIG. 11(a)). The system includes a master switch 202, pump motor 204, motor control switch 206, which controls the power to operate the rest of the system via conductor 208 and ground connection 210. A pair of normally open (NO) limit switches are shown at 212 and 214. As indicated, normally only one limit switch is used and it is closed by the presence of the cover roll in the stowed or home position. Connections are shown on conductors 216 and 218.

The system further includes a truck engine ignition interlock 220 which connects via lines 222 and 224. An ignition switch is shown at 226, also connected to truck battery 200. Diodes associated with the solenoid valve are shown at 228, 230, 232, 234, 236 and 238. An ignition interlock diode is shown at 240. Additional conductors associated with solenoids are shown at 242, 244, 250, 254 and 256 which connect the solenoids to their respective operating switches. Thus, conductors 242 and 244 connect the arm control solenoid valve 140 to a manual arm control switch 260, conductors 254 and 256 connect the mast operating solenoid 152 to manual mast switch 262 and conductor 250 connects mast fast solenoid 150 which is used to fix the portion of the mast with corresponding mast fast switch 264. An emergency stop button switch is depicted at 266.

Figure 2:
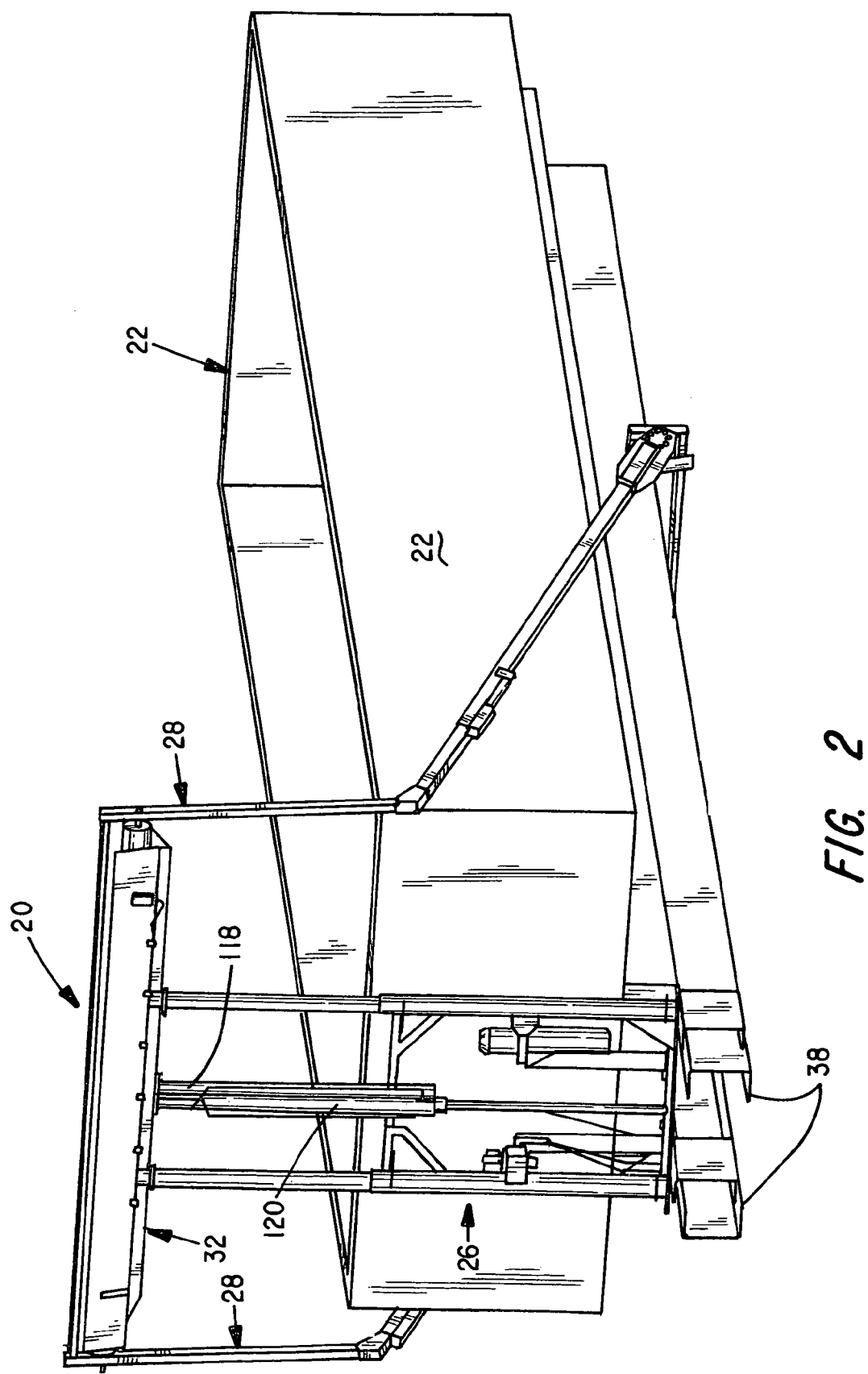
FIG. 2 is a view similar to that of FIG. 1, but showing the entire container and showing the mast in a partially raised position.
Figure 3:
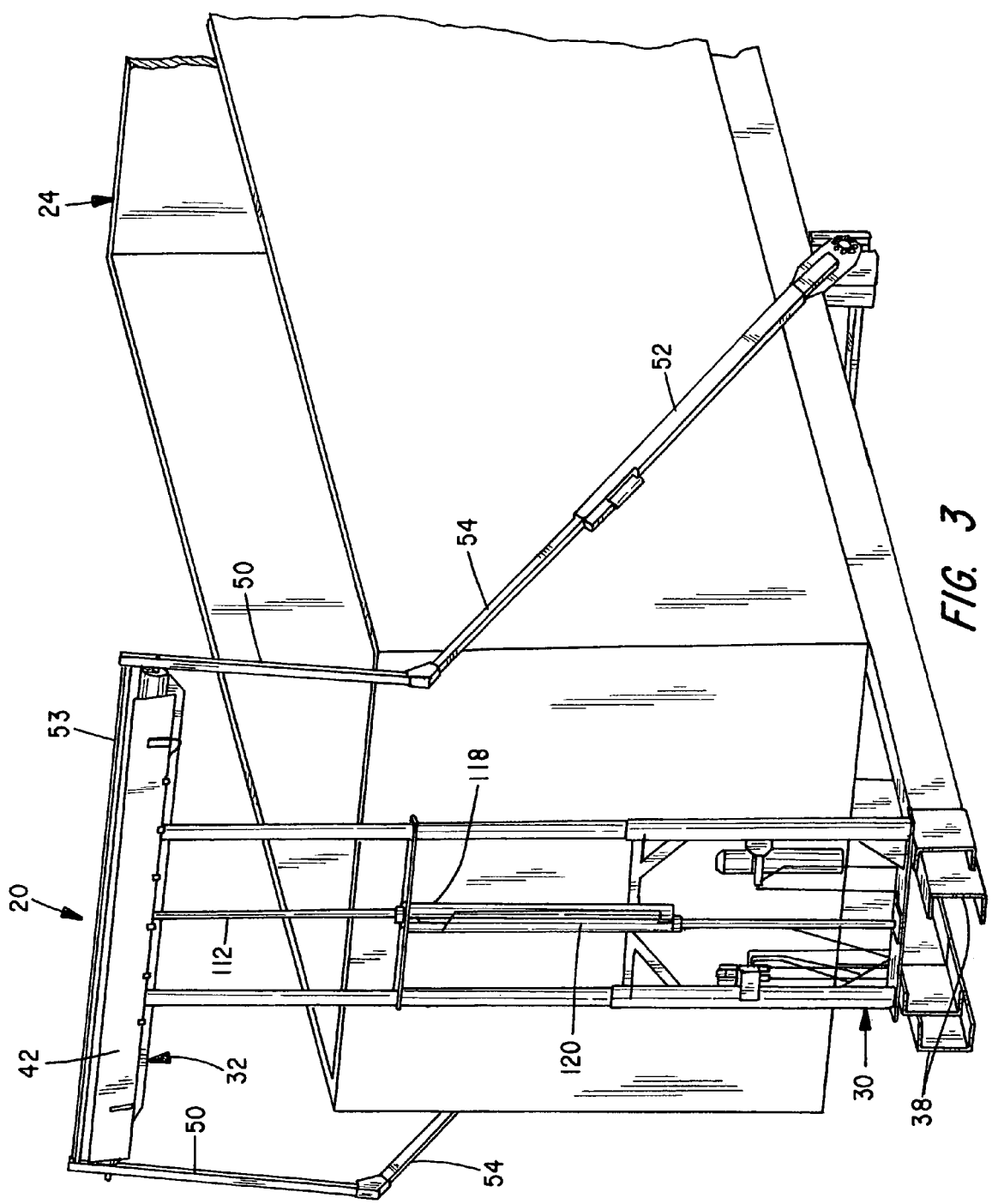
FIG. 3 is a view similar to FIG. 2 for a deeper 50-yard box showing the mast of the support structure in the fully raised position.
Figure 4:
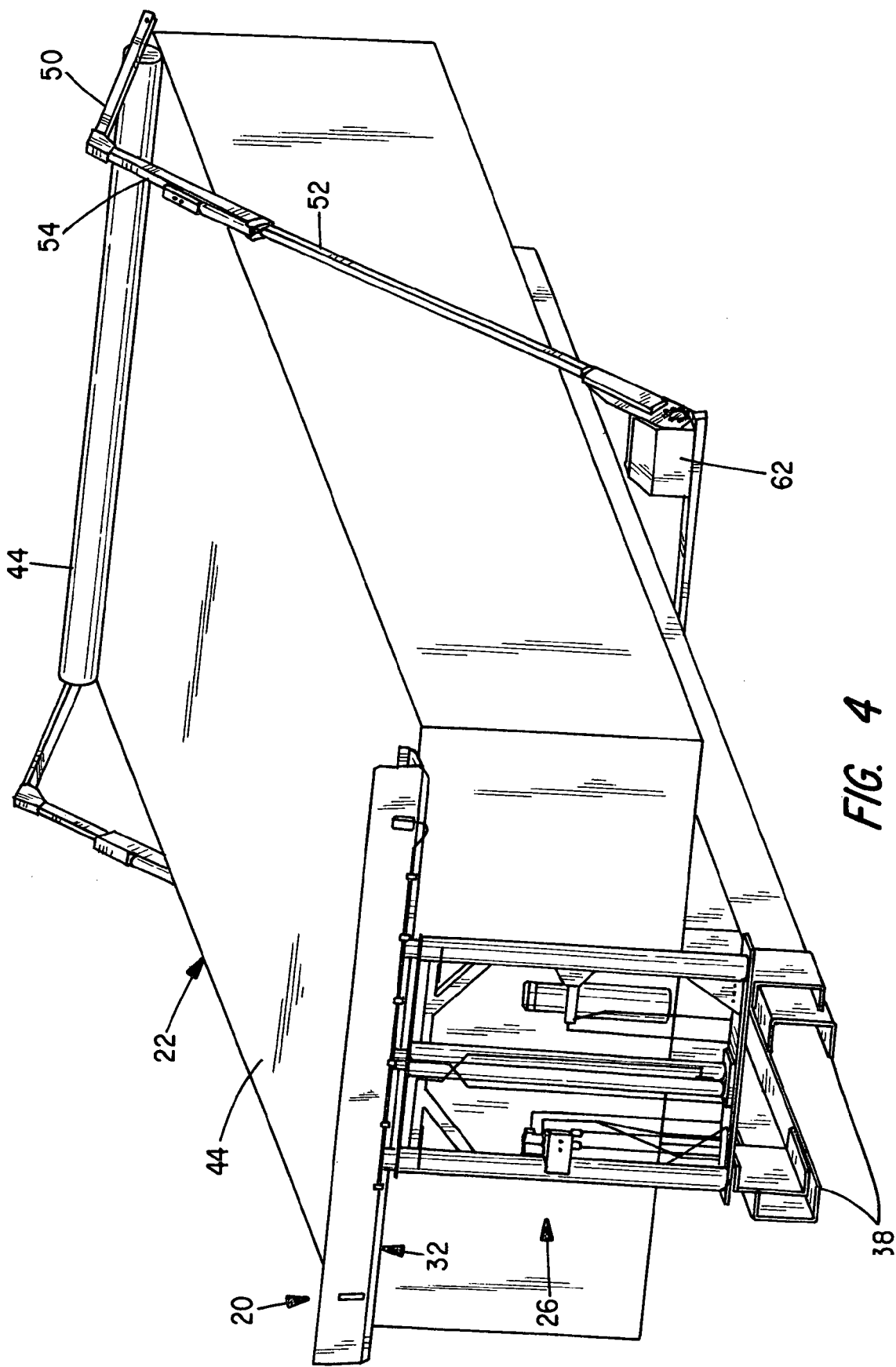
FIG. 4 is a view similar to FIG. 1 showing the entire box with the arms in a fully rearward position and the tarp in the fully deployed or covered position on the box and the mast lowered to the height of the box.
Figure 5:
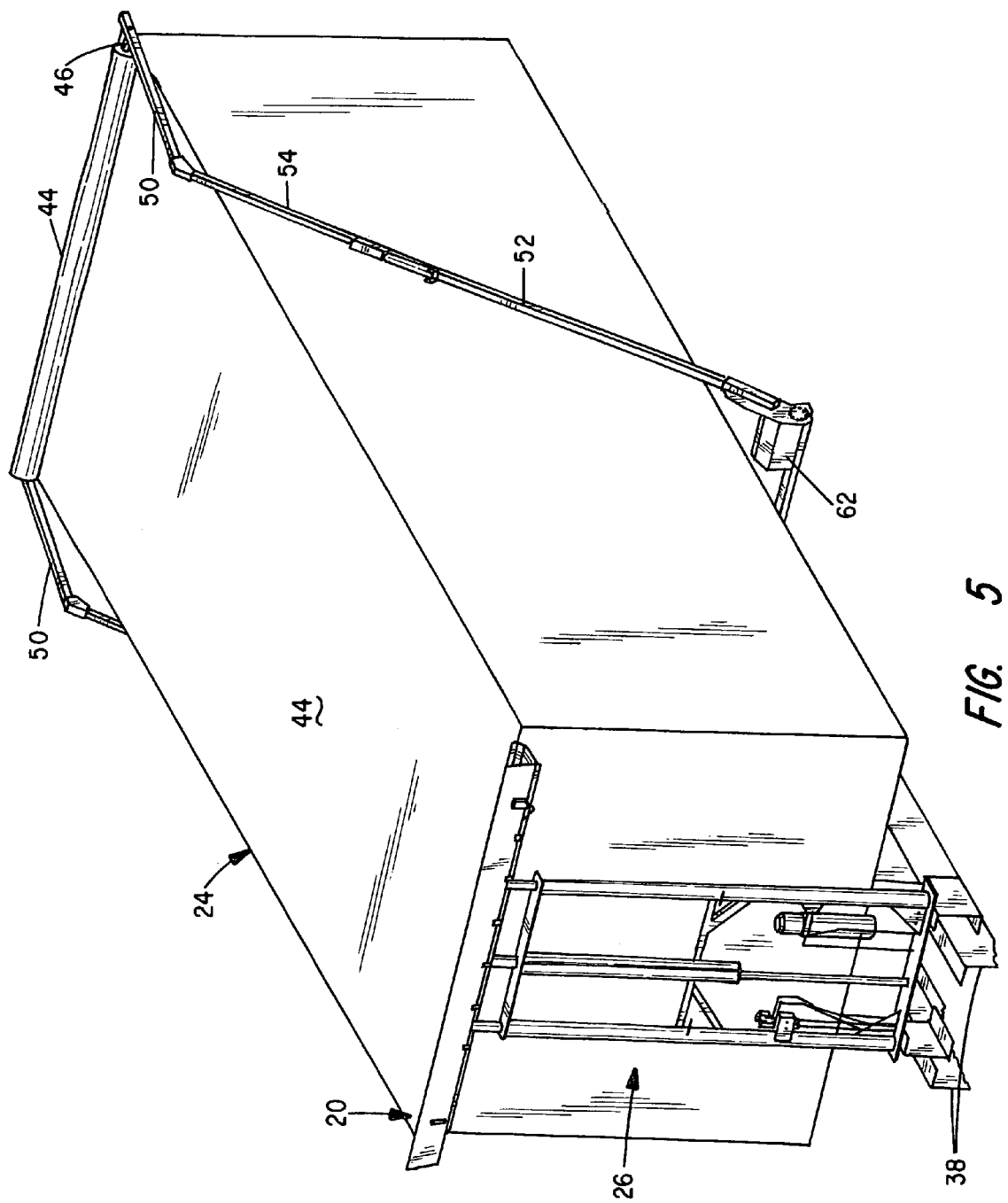
FIG. 5 is a view similar to FIG. 4 showing the mast in the partially raised position and a 50-yard box fully covered.
Figure 12:
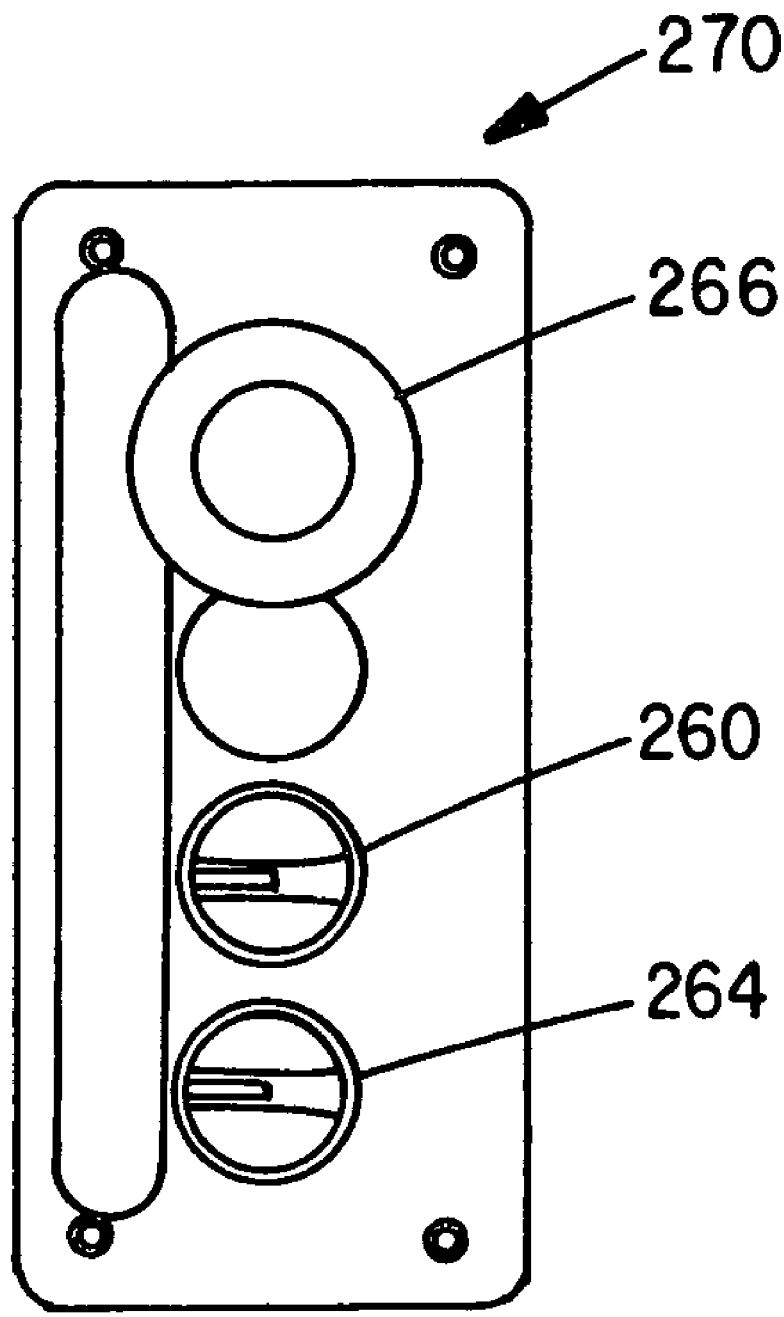
FIG. 12 is a schematic diagram of a possible control panel for operating the cover system of the invention.

FIG. 12 depicts a control panel with the plurality of operating switches which may be contained in a control box 270 including master switch 202, which is not shown in FIG. 2. The control panel includes mast switch 262 with up, down and neutral positions; arm switch 260 with indicated forward, reverse and neutral positions, the forward position being with the arms rotated to the front of the container and the flexible cover retracted and the reverse position extending the arms to the rear of the truck thereby throwing the cover over a container. The emergency "stop" button is shown at 266 which must be pulled out in order for the other switches and the rest of the system to operate. The control panel 270 can be located at any convenient position attached to the support system, but should be readily accessible to an operator standing alongside the truck.

Figure 11D:
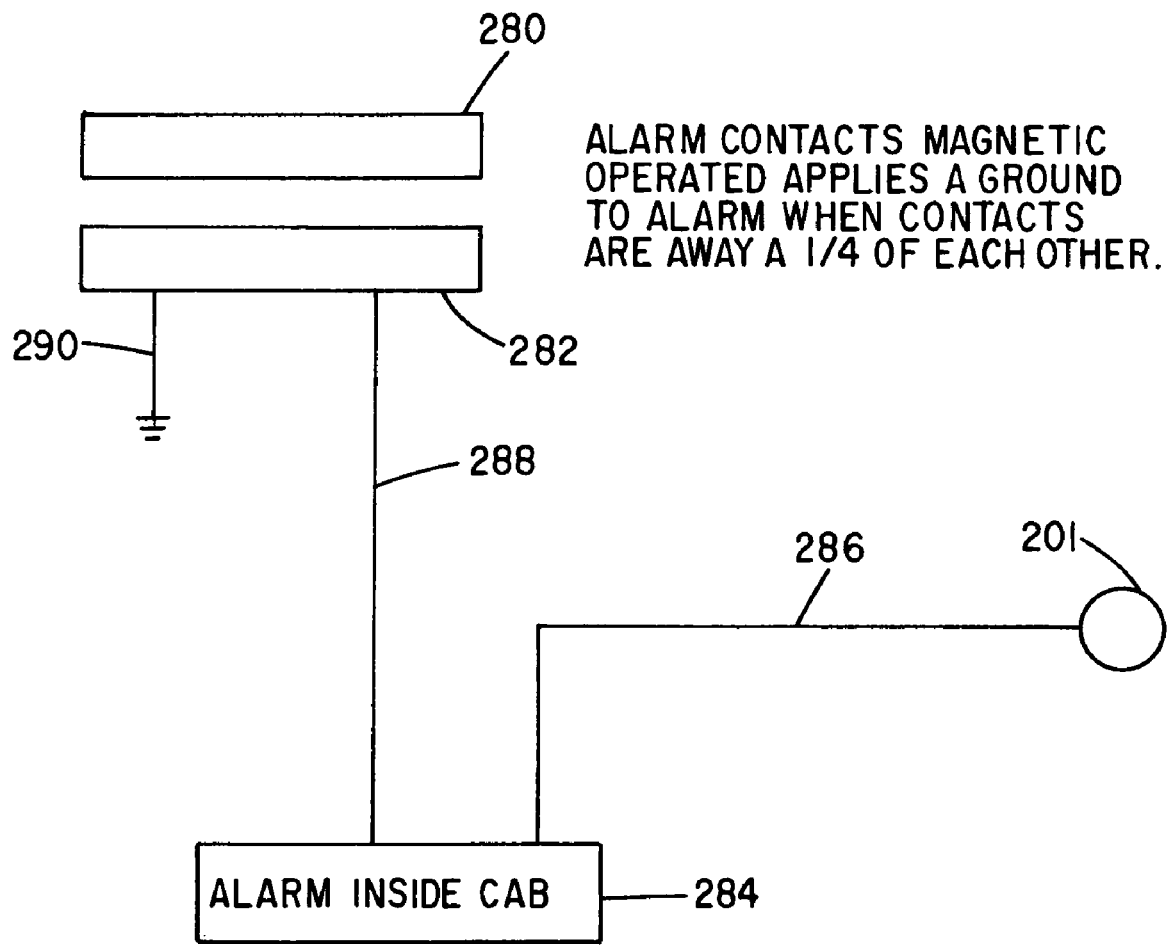
FIG. 11(d) illustrates a mast overheight alarm which indicates that the mast is fully raised.

In operation, when the system is not in use, the arms should be placed in the fully forward or home position such that the cover roll rests in the receiving trough on the mast and the mast is in its fully lowered position. A limit switch indicating that the cover roll is in this position is activated by the roll, the arm locks are engaged and the emergency "stop" button is depressed so that operation of the system is not possible. In addition, as shown in FIG. 11(d), an alarm system may be provided to indicate when the mast is fully raised so that it can be lowered before the vehicle is driven.

To start the process for covering a container, the system is turned on by turning or closing the master switch 202 which is placed in the "open" or "off" position when the system is not in use. Thereafter, the E-stop or emergency stop button 266 is pulled up, thereby enabling the operation of the remainder of the system. In the first step, the mast switch 262 is operated to raise the mast to the desired height depending on the depth and size of the container or truck body to be covered. With the mast switch 262 in the up position and the cover roll limit switch 212 or 214 activated, the arm locks are released allowing the arms to extend in conjunction with the raising of the mast. The arm locks will remain released as long as a limit switch 212 or 214 located in the trough which senses the presence of the cover roll is energized and the mast switch has been selected. The mast is continued to be raised until the desired arm length is reached, whereupon the mast switch is released and it returns to the neutral position and the arm locks are again engaged to secure the length of the arms at this point. The desired length for the arms is the length it will enable the cover roller to reach and rest on the rear of the container without falling over the end.

The system is now set to cover the container or open truck body with the flexible cover. In order to accomplish this, the arms are rotated toward the rear of the container by selecting the REV or arms back function on the arms switch 260 as the tarp roller lifts out of the mast trough, the limit switch 212 or 214 controlling the arm locks is also released and the arm locks engage and remain engaged whether the mast is operated or not. The arm switch is maintained in the arms back position by the operator until the cover roller rests on the rear of the container whereupon the arm switch 260 may be released and it returns to a neutral position. At this point, the mast is still raised above the height of the container and the flexible cover or tarp has been stretched to the rear or far end of the container. In order to tighten the flexible cover or tarp over the container, the mast is then lowered until the flexible cover covers the front of the container and it becomes even from front to rear. When this is done, inasmuch as the limit switch has been released, the arm locks remain engaged.

To start the process for uncovering the container, the steps are undertaken in reverse order. Thus, the mast is first raised by selecting the up function on the mast switch 262 and this is continued until the mast height corresponds again with the arm length and when the desired height is reached, the mast switch is released and the arms can be rotated by selecting the forward function until the tarp roller nears the mast trough. When the cover roller is close to the mast trough, the rotation of the arms forward may be stopped as needed so that the relative position of the mast and the roller can be determined and the mast height adjusted as necessary to just accommodate the roller with the arms in the fully forward position or home. After the mast trough is aligned with the cover roller, the rotation of the arms can be resumed until the cover roller rests in the mast trough at which time the arm switch can be released. At this point, the mast limit switch should again be actuated. Finally, the mast can be lowered by selecting down on the mast switch and again, as the limit switch is actuated, the arm locks will release allowing the arms to retract until the mast is lowered until the mast is completely collapsed. When the mast is collapsed, the mast switch can be released and the arm locks will again engage to secure the arm length in the fully retracted position. At this point, the system is now back in the home/start position with the arms rotated forward and the cover securely stored in the mast trough ready for the next cycle.

An alarm system may be provided to warn the operator if the mast remains up after covering or uncovering a container. As shown in FIG. 11(d), the mast alarm system includes a set of magnetic contacts 280, 282 and an alarm 284 located in the vehicle cab. The alarm is connected to positive battery terminal 201 via conductor 286 and conductors 288 and 290 connect the alarm device to the contacts which operate to complete the circuit to a ground connection. The full upward extension of the mast causes the contacts 280 and 282 to close and the alarm to be energized.

Figure 13:
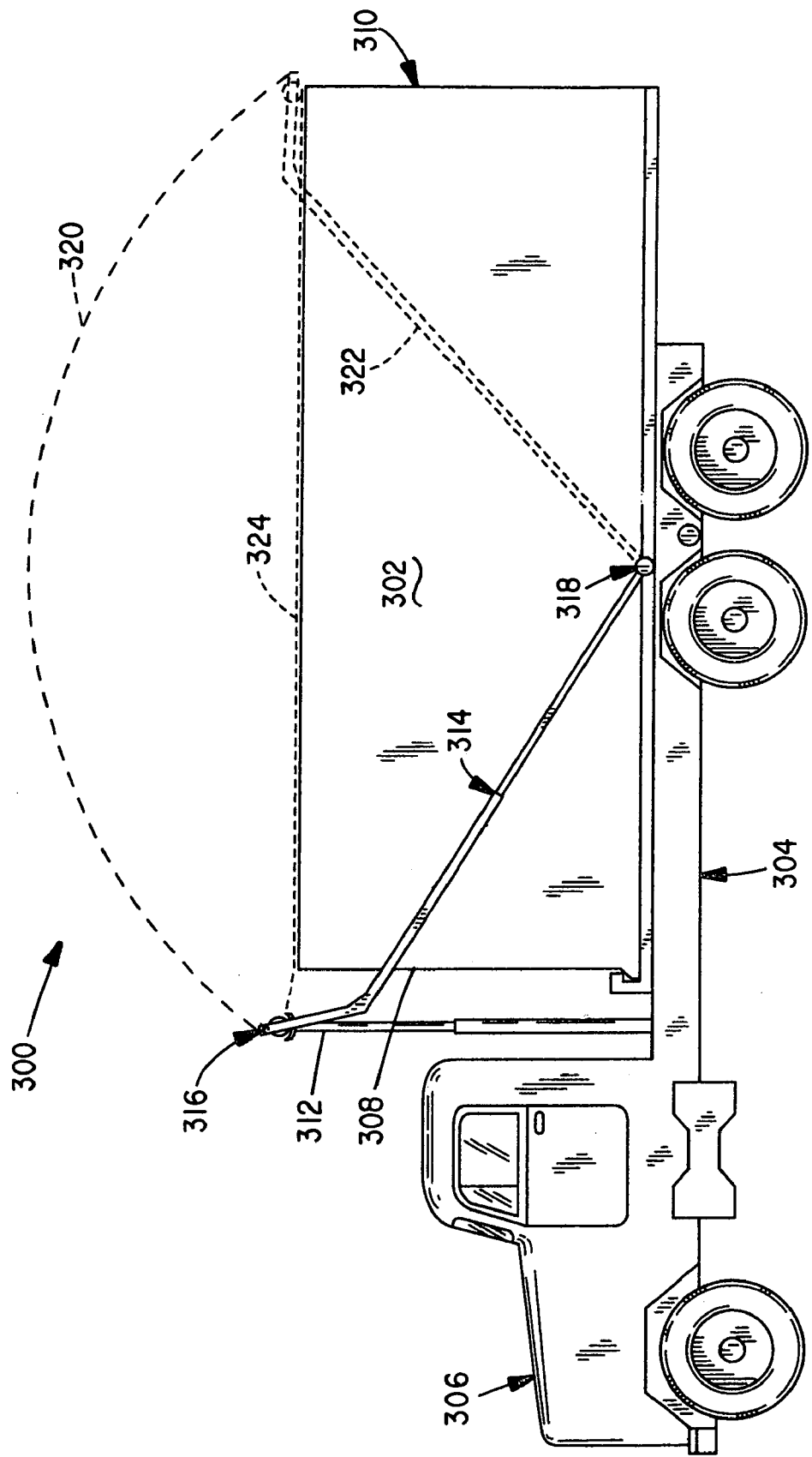
FIG. 13 is a schematic representation of a retractable cover which shows such a system mounted on a vehicle and addressing an open top container, the dotted lines illustrating the arc of the pivot arms as they pivot between the ends of the container indicating covered and uncovered positions.

FIG. 13 shows a vehicle 300 carrying a container 302 on a horizontal frame or bed 304. A cab is shown at 306. The container has a forward, front or first end 308 and a rear or second end 310. A variable-height mast 312 is shown raised and mounted in front of the container 302. Pivot arms 314 are mounted on opposite sides of the truck to address opposite sides of the container. Each pivot arm has an upper end 316 and a lower end 318 where it is pivotally mounted to a drive mechanism. The system is shown with the arms and cover in the start or home position. Dashed arc 320, dashed arm position 322 and dashed cover 324 indicate the path of deployment and retraction as the cover system is operated.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A vehicle-mountable self-contained independent cover operating system for operating a retractable cover with respect to an open top container or truck body mounted on a vehicle to cover and uncover the container or truck body comprising:
    (a) a flexible cover configured to cover an open top transport container of interest, the cover having a first end attached to a retracting storage source forming a roll thereon when said storage source is retracted, and a free end;
    (b) a support structure designed to be mounted on the vehicle at one end of the container or truck body to be covered, as located on said vehicle, said support structure having a base section and a mast section, the height of the mast section being adjustable with respect to the base section and a lift mechanism fixed with respect to the base section and operable to adjust the height of the mast section, said mast section having a cover support for the cover as retracted and said mast being connected to the free end of said cover;
    (c) a deployment mechanism for extending and retracting said flexible cover, said deployment mechanism further comprising a pair of spaced pivotally mounted articulated arms, one arm disposed on each side of a container to be covered, a drive mechanism connected to pivot each of said arms, each arm having two segments sequentially connected at a fixed angle, one of which includes an extendable member and so is of adjustable length and which includes a mechanical locking mechanism that also has a sliding wedge element for engaging and locking said extendable member, each of said arms having a free end generally connected such that pivoting said arms moves said storage source to extend and retract said flexible cover;

(d) a self-contained hydraulic system comprising hydraulic fluid reservoir and hydraulic pump for supplying pressurized hydraulic fluid to operate the system;

(e) a control system for controlling the operation of the system wherein said control system comprises an arm lock control that further comprises an electric interlock that controls the operation of said fluid-operated arm length locking mechanisms to lock said mechanism during deployment and retraction of said flexible cover;

(f) an electrical connecting element for connecting said independent cover operating system to a source of electric power; and (g) wherein said independent cover operating system is self-contained such that it needs only to be connected to said source of electric power so that the system can be mounted on an existing vehicle chassis without modification of existing vehicle systems.

2. A self-contained system as in claim 1 wherein said arm lock control device includes a limit switch indicating when said cover is fully retracted.

3. A self-contained system as in claim 1 wherein said locking mechanism for said adjustable length arm segment locking mechanism includes a hydraulic cylinder-operated locking wedge assembly.

4. A self-contained system as in claim 2 wherein said control system further contains an interlock between said limit switch and said length-variable arm segment locking mechanism such that said locking mechanism locks said adjustable length arm segment wherein said cover is not in the fully retracted position.

5. A self-contained system as in claim 1 wherein the open top container is a dump body.

6. A self-contained system as in claim 5 wherein said source of power is the electrical system of said vehicle on which the system is mounted.

7. A self-contained system as in claim 1 wherein said spaced articulated arms are connected together at their free ends by the ends of said retracting cover storage source and wherein said two segments of each arm are connected at a fixed angle.

8. A self-contained system as in claim 1 wherein said arms are pivotally mounted intermediate ends of a container to be covered and operated by hydraulic rotary actuators between positions in which the free ends of said arms address the ends of said container.

9. A self-contained system as in claim 1 wherein said lift mechanism for the mast includes a pair of piggy-backed hydraulic cylinders.

10. A self-contained system as in claim 1 wherein said control system includes an over limit mast height warning device.

11. A self-contained system as in claim 1 wherein said retractable storage source includes a winding mechanism for retracting said flexible cover.

12. A self-contained system as in claim 4 wherein the length of said arms is adjusted by adjusting the height of said mast.

13. A load-hauling vehicle for loading, unloading and transporting large open-topped containers comprising a self-contained independent cover operating system for operating a retractable cover with respect to an open top container or truck body as mounted on said vehicle to cover and uncover the container further comprising:

(a) a flexible cover configured to cover an open top transport container of interest, the cover having a first end attached to a retracting storage source forming a roll thereon when said storage source is retracted and a free end;

(b) a support structure designed to be mounted on the vehicle at one end of the container or truck body to be covered, as located on said vehicle, said support structure having a base section and a mast section, the height of the mast section being adjustable with respect to the base section and a lift mechanism fixed with respect to the base section and operable to adjust the height of the mast section, said mast section having a cover support for the cover as retracted and said mast being connected to the free end of said cover;

(c) a deployment mechanism for extending and retracting said flexible cover, said deployment mechanism further comprising a pair of spaced pivotally mounted articulated arms, one arm disposed on each side of a container to be covered, a drive mechanism connected to pivot each of said arms, each arm having two segments sequentially connected at a fixed angle, including a segment having an extendable member of adjustable length which includes a mechanical locking mechanism that includes a sliding wedge element that engages and locks said extendable member, each of said arms having a free end generally connected such that pivoting said arms moves said storage source to extend and retract said flexible cover;

(d) a self-contained hydraulic system comprising a hydraulic fluid reservoir and hydraulic pump for supplying pressurized hydraulic fluid to operate the system;

(e) a control system for controlling the operation of the system wherein said control system comprises an arm lock control that further comprises an electric interlock that controls the operation of said fluid-operated arm length locking mechanisms to lock said mechanism during deployment and retraction of said flexible cover;

(f) an electrical connecting element for connecting said independent cover operating system to a source of electric power; and (g) wherein said independent cover operating system is self-contained such that it needs only to be connected to said source of electric power so that the system can be mounted on an existing vehicle chassis without modification of existing vehicle systems.

* * * * *